United States Patent
Ueng

[19]

[11] Patent Number: 5,957,002
[45] Date of Patent: Sep. 28, 1999

[54] DUAL LEVER TYPE DERAILLEUR GEAR UNIT FOR A BICYCLE

[75] Inventor: Ti-Li Ueng, Taichung, Taiwan

[73] Assignee: Industrial Development Bureau, Taipei, Taiwan

[21] Appl. No.: 09/074,031

[22] Filed: May 6, 1998

[51] Int. Cl.[6] .......................... B62M 25/04; B62K 23/06
[52] U.S. Cl. ........................... 74/502.2; 74/142; 74/475; 74/489
[58] Field of Search .................... 74/502.2, 475, 74/489, 142

[56] References Cited

U.S. PATENT DOCUMENTS

| | | | |
|---|---|---|---|
| 5,012,692 | 5/1991 | Nagano | 74/475 |
| 5,213,005 | 5/1993 | Nagano | 74/502.2 |
| 5,241,878 | 9/1993 | Nagano | 74/502.2 |
| 5,287,766 | 2/1994 | Nagano | 74/502.2 |
| 5,400,675 | 3/1995 | Nagano | 74/502.2 |
| 5,701,786 | 12/1997 | Kawakami | 74/502.2 |
| 5,730,030 | 3/1998 | Masui | 74/475 |
| 5,732,593 | 3/1998 | Hwang et al. | 74/142 |

*Primary Examiner*—Vinh T. Luong
*Attorney, Agent, or Firm*—William E. Pelton

[57] ABSTRACT

A derailleur gear unit includes a ratchet wheel rotatably mounted around a pivot base and formed with a plurality of teeth. A retaining disk is fixedly mounted around the pivot base, and a shank extends from an outer periphery of the retaining disk and is formed with a catch. A first shifting lever includes a first end portion, a mediate portion rotatably mounted around the pivot base, and a second end portion. A pawl member is pivotally mounted on the first end portion of the first shifting lever and includes an arcuate guiding track slidably abutting on the catch, and a detent meshing with one of the teeth of the ratchet wheel. A second shifting lever includes a first end portion pivotally mounted around the pivot base and a second end portion. A pushing rod located radially opposite to the detent of the pawl member is mounted on the first end portion of the second shifting lever and meshes with one of the teeth of the ratchet wheel.

10 Claims, 6 Drawing Sheets

DUAL LEVER TYPE DERAILLEUR GEAR UNIT FOR A BICYCLE

FIELD OF THE INVENTION

The present invention relates to a derailleur gear unit, and more particularly to a dual lever type derailleur gear unit for a bicycle.

BACKGROUND OF THE INVENTION

A conventional dual lever type derailleur gear unit for a bicycle comprises a wire carrying wheel rotatably mounted on a supporting base for moving a derailleur wire so as to control the pivot motion of a front derailleur (or a rear derailleur) of the bicycle, a ratchet wheel fixedly engaged with the wire carrying wheel for rotating it, a first shifting lever provided for rotating the ratchet wheel together with the wire carrying wheel along one direction so as to tension the derailleur wire, a second shifting lever provided for rotating the ratchet wheel together with the wire carrying wheel along a reverse direction so as to release the derailleur wire, and a plurality of ratchet mechanisms for controlling the normal and reverse rotation of the ratchet wheel.

By such an arrangement, however, the construction of such a conventional dual lever type derailleur gear unit is complicated, thereby causing an inconvenience in assembling and maintenance.

The present invention has arisen to mitigate and/or obviate the disadvantage of the conventional treadmill.

SUMMARY OF THE INVENTION

In accordance with one aspect of the present invention, there is provided a derailleur gear unit comprising a pivot base fixedly mounted on a supporting base. A ratchet wheel is rotatably mounted around the pivot base and includes an outer periphery formed with a plurality of teeth.

A retaining disk is fixedly mounted around the pivot base and abuts on the ratchet wheel, and a shank extends outwardly from an outer periphery of the retaining disk and is formed with a catch extending laterally.

A first shifting lever includes a first end portion located adjacent to the shank of the retaining disk, a mediate portion rotatably mounted around the pivot base and abutting on the retaining disk, and a second end portion. A pawl member is pivotally mounted on the first end portion of the first shifting lever and includes an arcuate guiding track slidably abutting on the catch, and a detent detachably meshing with one of the teeth of the ratchet wheel.

A second shifting lever includes a first end portion pivotally mounted around the pivot base and abutting on the first shifting lever and a second end portion. A pushing rod located radially opposite to the detent of the pawl member is mounted on the first end portion of the second shifting lever and detachably meshes with one of the teeth of the ratchet wheel.

Further features of the present invention will become apparent after a careful reading of the detailed description with appropriate reference to the accompanying drawings.

DETAILED DESCRIPTION OF THE PREFERRED EMBODIMENTS

Figure 1:
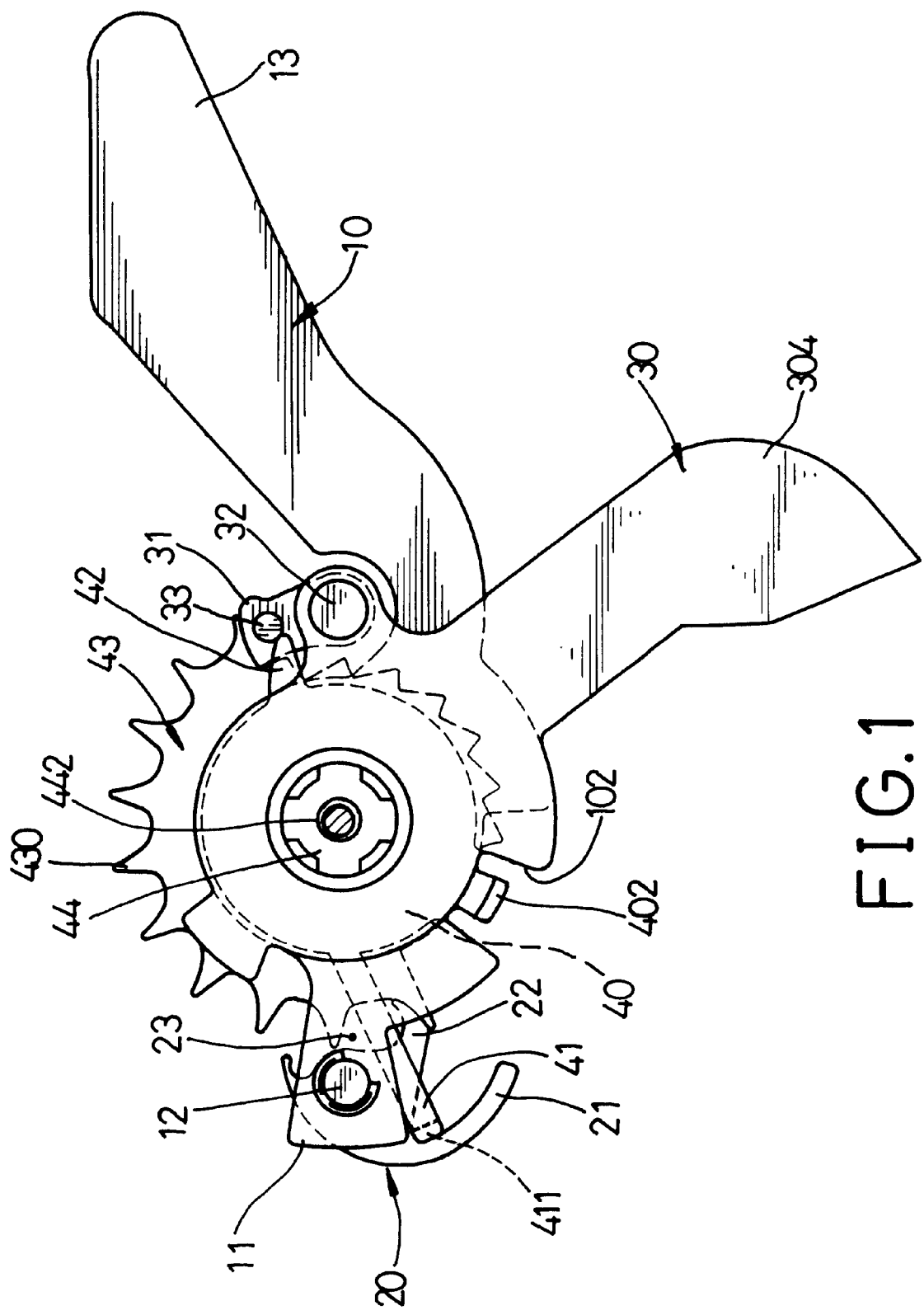
FIG. 1 is a top plan view of a derailleur gear unit in accordance with the present invention.
Figure 2:
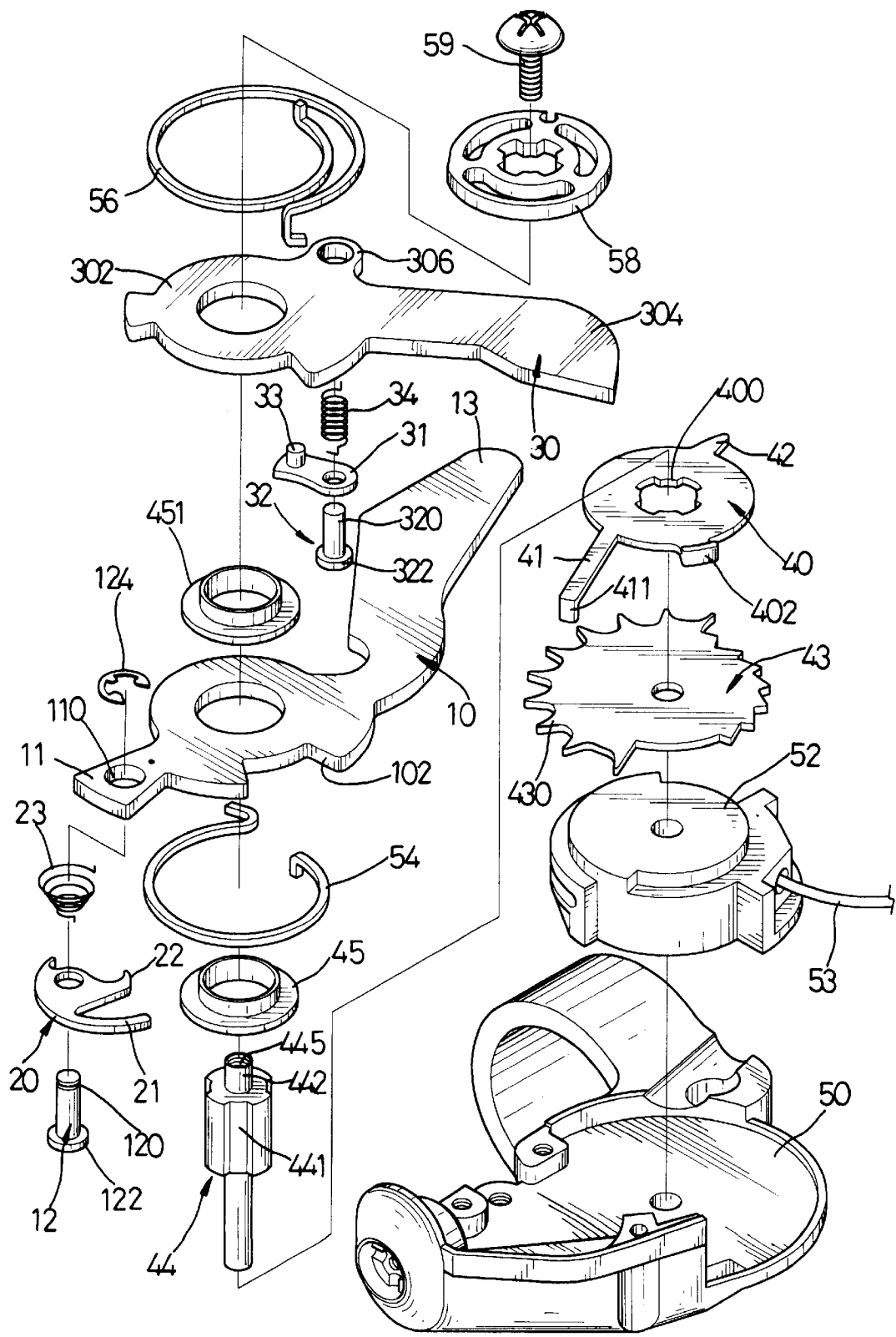
FIG. 2 is an exploded view of the derailleur gear unit shown in FIG. 1.

Referring to the drawings, and initially to FIGS. 1 and 2, a dual lever type derailleur gear unit in accordance with the present invention can be adapted to control a front derailleur (not shown) or a rear derailleur (not shown) of a bicycle and comprises a supporting base 50, and a pivot base 44 fixedly mounted on the supporting base 50.

A wire carrying wheel 52 is rotatably mounted around the pivot base 44 and is supported on the supporting base 50. A derailleur wire 53 includes a first end portion fixedly connected to the wire carrying wheel 52 to move therewith and a second end portion connected to the front derailleur or the rear derailleur of the bicycle.

A ratchet wheel 43 fixedly engaged with the wire carrying wheel 52 is rotatably mounted around the pivot base 44 and includes an outer periphery formed with a plurality of teeth 430.

A retaining disk 40 is fixedly mounted around the pivot base 44 and abuts on the ratchet wheel 43, and a shank 41 extends outwardly from an outer periphery of the retaining disk 40 and is formed with a catch 411 extending laterally.

The pivot base 44 includes an outer wall longitudinally defining a plurality of splines 441, and the retaining disk 40 includes an inner wall formed with a plurality of keys 400 each received in a corresponding one of the splines 441 such that the retaining disk 40 can be secured on the pivot base 44.

A first shifting lever 10 includes a first end portion 11 located adjacent to the shank 41 of the retaining disk 40, a mediate portion rotatably mounted around the pivot base 44 and abutting on the retaining disk 40, and a second end portion 13. A first bushing 45 is mounted around the pivot base 44 for supporting the first shifting lever 10.

A biasing member 54 such as a disk-shaped torsional spring is mounted around the pivot base 44 and includes a first end portion fixedly mounted on the mediate portion of the first shifting lever 10 and a second end portion fixedly mounted on retaining disk 40.

The first shifting lever 10 defines a recess 102 in the mediate portion thereof, and the retaining disk 40 is formed with a limiting block 402 on the outer periphery thereof and slidably received in the recess 102.

A pawl member 20 is pivotally mounted on the first end portion 11 of the first shifting lever 10 and includes an arcuate guiding track 21 slidably abutting on the catch 411, and a detent 22 detachably meshing with one of the teeth 430 of the ratchet wheel 43.

The first shifting lever 10 defines a hole 110 in the first end portion 11 thereof. The pawl member 20 is pivotally mounted a pivot axle 12 which includes a first end portion 120 extending through the hole 110 and a second end portion formed with an annular flange 122 for retaining the pawl member 20.

A snapping ring 124 is fixedly mounted on the first end portion 120 of the pivot axle 12 and abuts on the first end portion 11 of the first shifting lever 10. A biasing member 23 such as a disk-shaped torsional spring is mounted around the pivot axle 12 and includes a first end portion fixedly mounted on the first end portion 11 of the first shifting lever 10 and a second end portion fixedly mounted on the pawl member 20.

A second shifting lever 30 includes a first end portion 302 pivotally mounted around the pivot base 44 and abutting on the first shifting lever 10 and a second end portion 304. A second bushing 451 is mounted around the pivot base 44 for supporting the second shifting lever 30.

A tubular lug 442 extends upwardly from the pivot base 44 and defines a threaded hole 445, a washer 58 is mounted around the tubular lug 442, a positioning bolt 59 is engaged in the threaded hole 445 for retaining the washer 58, and a biasing member 56 such as a disk-shaped torsional spring is mounted around the tubular lug 442 and includes a first end portion fixedly mounted on the washer 58 and a second end portion fixedly mounted on the first end portion 302 of the second shifting lever 30.

The second shifting lever 30 is formed with an ear 306 on the first end portion 302 thereof. A pivot shaft 32 includes a first end portion 320 fixedly mounted on the ear 306 and a second end portion.

A supporting arm 31 is pivotally mounted on the pivot shaft 32, and the second end portion of the pivot shaft 32 is formed with an annular flange 322 for retaining the supporting arm 31.

A biasing member 34 such as a torsional spring is mounted around the pivot shaft 32 and includes a first end portion fixedly mounted on the ear 306 and a second end portion fixedly mounted on the supporting arm 31.

A pushing rod 33 located radially opposite to the detent 22 of the pawl member 20 is mounted on the supporting arm 31, and detachably meshes with one of the teeth 430 of the ratchet wheel 43.

The retaining disk 40 is formed with a stop 42 on the outer periphery thereof for stopping the pushing rod 33, and located radially opposite to the shank 41 thereof.

Figure 3:
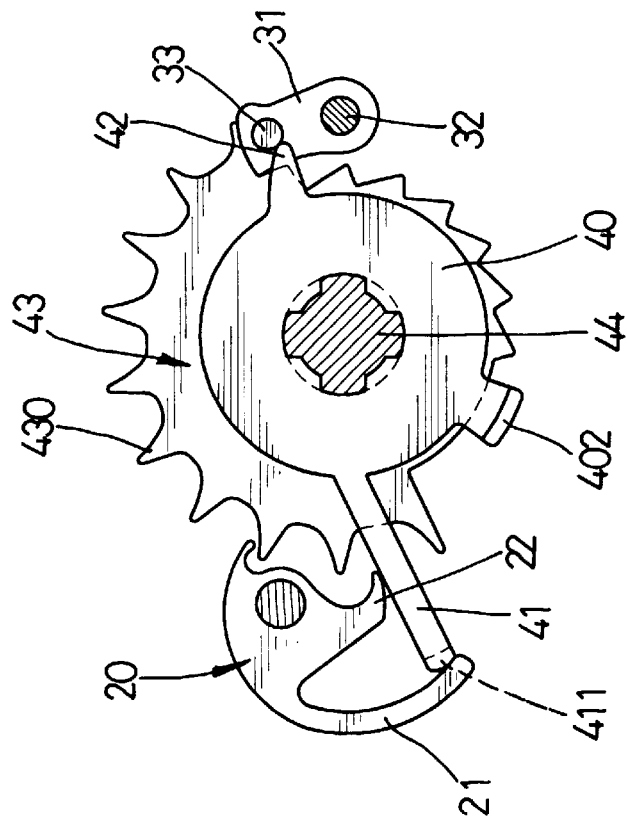
FIGS. 3–5 are partially cut-away top plan operational views showing a ratchet wheel being rotated along a clockwise direction.
Figure 5:
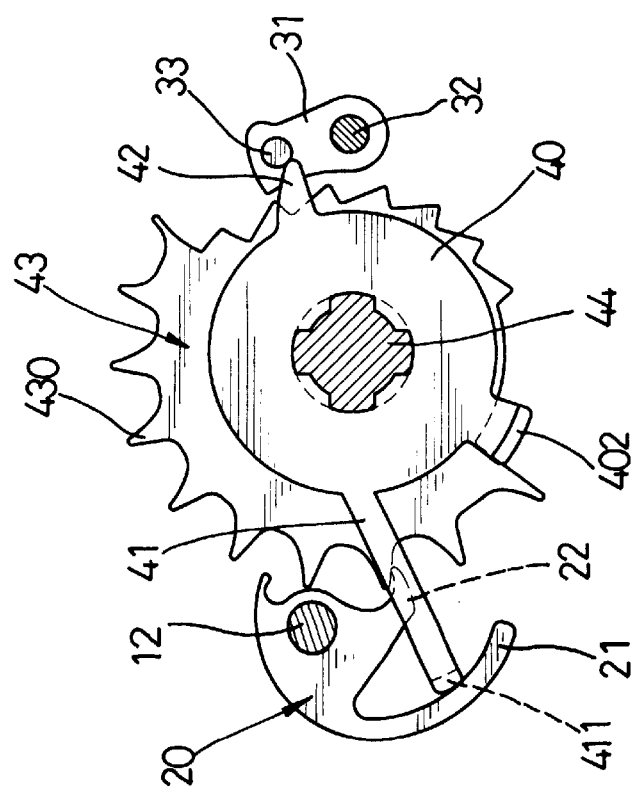
Figure 4:
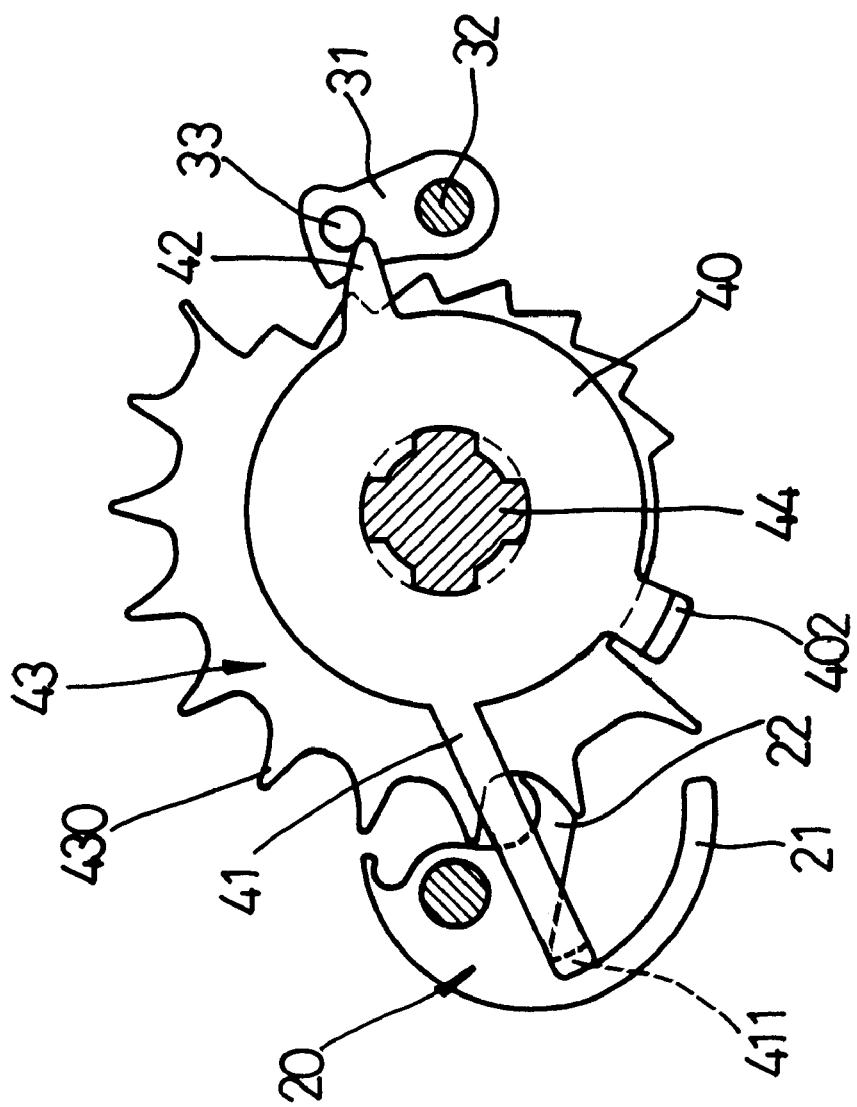

In operation, referring to FIGS. 3–5 with reference to FIGS. 1 and 2, the first shifting lever 10 can initially be rotated along a counterclockwise direction so as to move the pawl member 20 therewith.

The movement of the pawl member 20 is limited by a contact between the arcuate guiding track 21 and the catch 411 such that the pawl member 20 can be rotated along a counterclockwise direction from the position as shown in FIG. 3 to the position as shown in FIG. 4 while the detent 22 meshing with one of the teeth 430 can be rotated with the pawl member 20 so as to rotate the ratchet wheel 43 along a clockwise direction, thereby rotating the wire carrying wheel 52 which can in turn move the derailleur wire 53 so as to control the pivot motion of the front derailleur or the rear derailleur, thereby achieving the purpose of shifting the speed of the bicycle.

When the first shifting lever 10 is released, the pawl member 20 can then be rotated along a clockwise direction by means of the returning action of the biasing member 23 from the position as shown in FIG. 4 to the position as shown in FIG. 5 whereby the above-mentioned operation can be repeated such that the speed of the bicycle can be continuously shifted.

Figure 7:
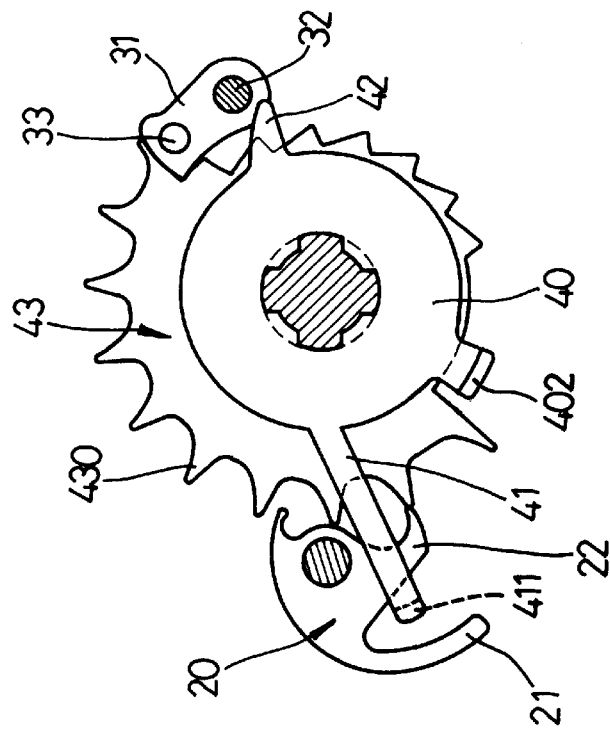
FIGS. 6–8 are partially cut-away top plan operational views showing a ratchet wheel being rotated along a counterclockwise direction.
Figure 6:
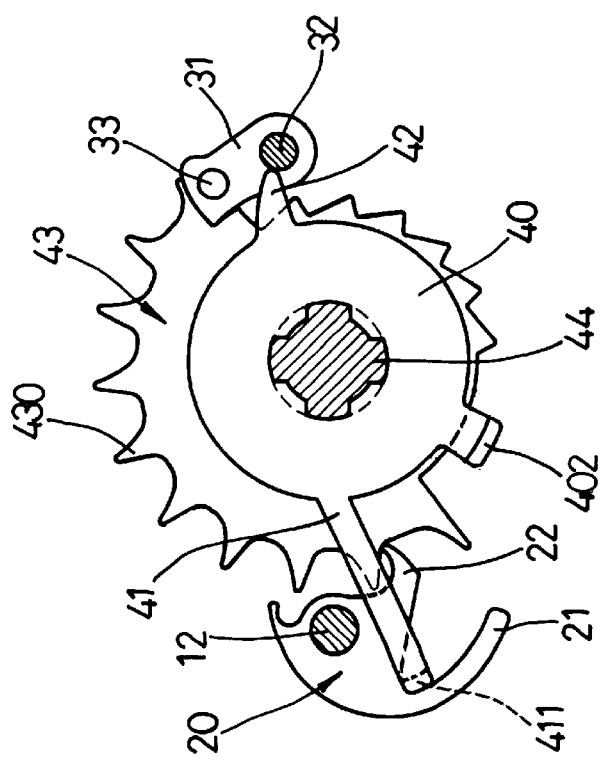
Figure 8:
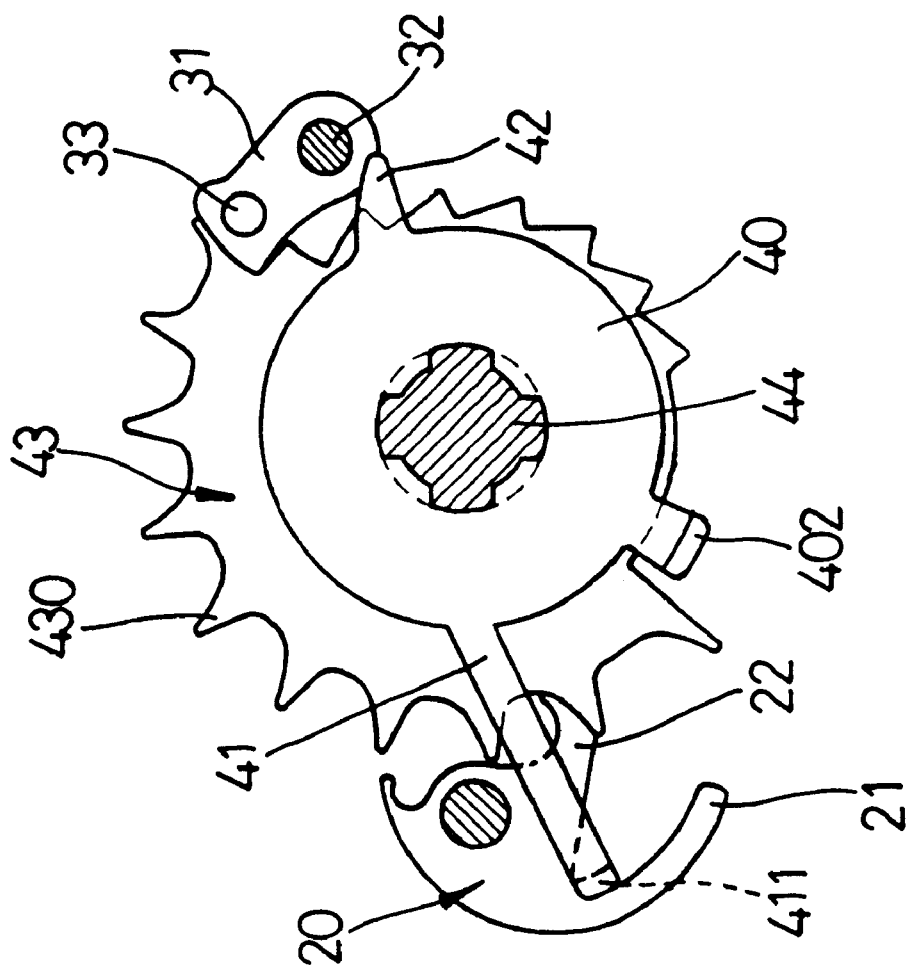

Referring now to FIGS. 6–8 with reference to FIGS. 1 and 2, the second shifting lever 30 can be rotated along a counterclockwise direction so as to move the pushing rod 33 therewith.

The pushing rod 33 abutting on one of the teeth 430 of the ratchet wheel 43 can then move the ratchet wheel 43 to rotate along a counterclockwise direction from the position as shown in FIG. 6 via the position as shown in FIG. 7 and finally to the position as shown in FIG. 8, whereby the pawl member 20 idles.

The above-mentioned operation can be repeated, thereby in turn returning the ratchet wheel 43 to its original position.

It should be clear to those skilled in the art that further embodiments may be made without departing from the scope and spirit of the present invention.

What is claimed is:

1. A derailleur gear unit comprising:

a supporting base (50);

a pivot base (44) fixedly mounted on said supporting base (50);

a ratchet wheel (43) rotatably mounted around said pivot base (44) and including an outer periphery formed with a plurality of teeth (430);

a retaining disk (40) fixedly mounted around said pivot base (44) and abutting on said ratchet wheel (43), and a shank (41) extending outwardly from an outer periphery of said retaining disk (40) and formed with a catch (411) extending laterally;

a first shifting lever (10) including a first end portion (11) located adjacent to said shank (41) of said retaining disk (40), a mediate portion rotatably mounted around said pivot base (44) and abutting on said retaining disk (40), and a second end portion (13);

a pawl member (20) pivotally mounted on said first end portion (11) of said first shifting lever (10) and including an arcuate guiding track (21) slidably abutting on said catch (411), and a detent (22) detachably meshing with one of said teeth (430) of said ratchet wheel (43);

a second shifting lever (30) including a first end portion (302) pivotally mounted around said pivot base (44) and abutting on said first shifting lever (10) and a second end portion (304); and a pushing rod (33) mounted on said first end portion (302) of said second shifting lever (30), located radially opposite to said detent (22) of said pawl member (20), and detachably meshing with one of said teeth (430) of said ratchet wheel (43).

2. The derailleur gear unit in accordance with claim 1, further comprising a wire carrying wheel (52) rotatably mounted around said pivot base (44), supported on said supporting base (50), and fixedly mounted on said ratchet wheel (43) to rotate therewith.

3. The derailleur gear unit in accordance with claim 2, further comprising a derailleur wire (53) including a first end portion fixedly connected to said wire carrying wheel (52) and a second end portion.

4. The derailleur gear unit in accordance with claim 1, wherein said pivot base (44) includes an outer wall longitudinally defining a plurality of splines (441), and said retaining disk (40) includes an inner wall formed with a plurality of keys (400) each received in a corresponding one of said splines (441).

5. The derailleur gear unit in accordance with claim 1, wherein said retaining disk (40) is formed with a stop (42) on said outer periphery thereof and located radially opposite to said shank (41) for stopping said pushing rod (33).

6. The derailleur gear unit in accordance with claim 1, wherein said first shifting lever (10) defines a recess (102) in said mediate portion thereof, and said retaining disk (40) is formed with a limiting block (402) on said outer periphery thereof and received in said recess (102).

7. The derailleur gear unit in accordance with claim 1, wherein said first shifting lever (10) defines a hole (110) in said first end portion (11) thereof, and said derailleur gear unit further comprises a pivot axle (12) on which said pawl member (20) is pivotally mounted including a first end portion (120) extending through said hole (110) and a second end portion, a snapping ring (124) fixedly mounted on said first end portion (120) of said pivot axle (12) and abutting on said first end portion (11) of said first shifting lever (10), and a biasing member (23) mounted around said pivot axle (12) and including a first end portion fixedly mounted on said first end portion (11) of said first shifting lever (10) and a second end portion fixedly mounted on said pawl member (20).

8. The derailleur gear unit in accordance with claim 7, wherein said second end portion of said pivot axle (12) is formed with an annular flange (122) for retaining said pawl member (20).

9. The derailleur gear unit in accordance with claim 1, wherein said second shifting lever (30) is formed with an ear (306) on said first end portion (302) thereof, and said derailleur gear unit further comprises a pivot shaft (32) including a first end portion (320) fixedly mounted on said ear (306) and a second end portion, a supporting arm (31) pivotally mounted on said pivot shaft (32), and a biasing member (34) mounted around said pivot shaft (32) and including a first end portion fixedly mounted on said ear (306) and a second end portion fixedly mounted on said supporting arm (31), and said pushing rod (33) is fixedly mounted on said supporting arm (31).

10. The derailleur gear unit in accordance with claim 9, wherein said second end portion of said pivot shaft (32) is formed with an annular flange (322) for retaining said supporting arm (31).

\* \* \* \* \*